(12) United States Patent
Pearson (10) Patent No.: US 6,767,487 B2
(45) Date of Patent: Jul. 27, 2004

(54) PLASTIC EXPULSION PROCESS

(75) Inventor: Terrence C. Pearson, Nantwich (GB)

(73) Assignee: Cinpres Gas Injection Ltd., Staffordshire (GB)

( * ) Notice: Subject to any disclaimer, the term of this patent is extended or adjusted under 35 U.S.C. 154(b) by 300 days.

(21) Appl. No.: 09/902,354

(22) Filed: Jul. 10, 2001

(65) Prior Publication Data

US 2003/0011110 A1 Jan. 16, 2003

(51) Int. Cl.[7] .............................................. B29D 22/00
(52) U.S. Cl. ...................... 264/40.4; 264/40.1; 264/572
(58) Field of Search ............................ 264/572, 40.1, 264/40.4

(56) References Cited

U.S. PATENT DOCUMENTS

| | | | |
|---|---|---|---|
| 2,331,688 A | 10/1943 | Hobson | |
| 2,345,144 A | 3/1944 | Opavsky | |
| 2,714,747 A | 8/1955 | Lindemann | |
| 2,714,748 A | 8/1955 | Stimemann | |
| 3,021,559 A | 2/1962 | Strong | |
| 3,044,118 A | 7/1962 | Bernhardt | |
| 3,135,640 A | 6/1964 | Kepka | |
| 3,687,582 A | 8/1972 | Hendry et al. | |
| 3,966,372 A | 6/1976 | Yasuike et al. | |
| 4,033,710 A | 7/1977 | Hanning | |
| 4,078,875 A | 3/1978 | Eckardt | |
| 4,082,226 A | 4/1978 | Appleman et al. | |
| 4,091,057 A | 5/1978 | Weber | |
| 4,092,389 A | 5/1978 | Sakurai | |
| 4,101,617 A | 7/1978 | Friederich | |
| 4,104,353 A | 8/1978 | Monnet | |
| 4,106,887 A | 8/1978 | Yasuike et al. | |
| 4,129,635 A | 12/1978 | Yasuike et al. | |
| 4,136,220 A | 1/1979 | Olabisi | |
| 4,140,672 A | 2/1979 | Kataoka | |
| 4,234,642 A | 11/1980 | Olabisi | |
| 4,247,515 A | 1/1981 | Olabisi | |
| 4,255,368 A | 3/1981 | Olabisi | |
| 4,333,608 A | 6/1982 | Hendry | |
| 4,357,296 A | 11/1982 | Hafele | |
| 4,474,717 A | 10/1984 | Hendry | |
| 4,555,225 A | 11/1985 | Hendry | |
| 4,601,870 A | 7/1986 | Sasaki | |
| 4,604,044 A | 8/1986 | Hafele | |
| 4,740,150 A | 4/1988 | Sayer | |
| 4,781,554 A | 11/1988 | Hendry | |
| 5,069,859 A | 12/1991 | Loren | |
| 5,090,886 A | 2/1992 | Jaroschek | |
| 5,098,637 A | 3/1992 | Hendry | |
| 5,204,051 A | 4/1993 | Jaroschek | |
| 5,423,667 A | 6/1995 | Jaroschek | |
| 5,759,459 A | 6/1998 | Eckardt et al. | |
| 5,759,479 A * | 6/1998 | Gotterbauer | 264/572 |
| 5,928,677 A | 7/1999 | Gosdin | |
| 6,159,415 A | 12/2000 | Tanada | |
| 6,372,177 B1 * | 4/2002 | Hildesson et al. | 264/572 |

FOREIGN PATENT DOCUMENTS

| | | |
|---|---|---|
| DE | 651 725 | 10/1937 |
| DE | 1194127 | 6/1965 |
| DE | 2 159 344 | 5/1972 |
| DE | 2651725 B1 | 4/1978 |
| DE | 3444532 | 6/1986 |
| DE | 39 13 109 A1 | 10/1990 |
| DE | 40 33 298 | 5/1991 |
| DE | 195 31 709 A1 | 3/1997 |
| DE | 2 106 546 | 7/1999 |

(List continued on next page.)

Primary Examiner—Suzanne E. McDowell (57) ABSTRACT

A system and process for gas assisted plastic injection molding. The plastic material is injected into the mold cavity and the molding pressure is held for a period of time. Thereafter, gas is injected into the plastic material and the pressure is again held for a period of time. Thereafter, valve members are opened allowing plastic to be expelled into one or more secondary cavities, or to be expelled back into the machine barrel.

16 Claims, 3 Drawing Sheets

FOREIGN PATENT DOCUMENTS

| | | |
|---|---|---|
| EP | 0 289 230 | 11/1988 |
| EP | 0 309 182 | 3/1989 |
| EP | 0 309 257 | 3/1989 |
| EP | 0321117 | 6/1989 |
| EP | 0 321 117 | 6/1989 |
| EP | 0 402 730 | 6/1990 |
| EP | 0 950 493 A1 | 10/1999 |
| FR | 1145411 | 10/1957 |
| FR | 2256021 | 7/1975 |
| GB | 1 460 101 | 12/1976 |
| GB | 1 487 187 | 9/1977 |
| GB | 2 100 661 | 1/1983 |
| GB | 2 122 130 | 1/1984 |
| GB | 2139548 | 11/1984 |
| GB | 2315040 | 1/1998 |
| JP | 50-74660 | 6/1975 |
| JP | 5714968 | 6/1975 |
| JP | 3009820 | 1/1991 |
| JP | 3-121820 | 5/1991 |
| JP | 06155501 | 6/1994 |
| JP | 06297522 | 10/1994 |
| JP | 10291227 | 11/1998 |
| JP | 11333876 | 12/1999 |
| WO | WO 96/34731 | 11/1996 |

\* cited by examiner

PLASTIC EXPULSION PROCESS

TECHNICAL FIELD

The present invention relates to the field of injection molding of plastic materials, and in particular to gas assisted molding.

BACKGROUND OF THE INVENTION

Injection molding of plastic materials is well known and widely practiced as a means of manufacturing an ever-increasing diversity of plastic components for industrial and consumer use. During the last two decades, versions of the process globally referred to as "gas assisted molding" have been developed and used to overcome some of the problems inherent in conventional molding, and to reduce costs and improve the quality of the final products.

In conventional gas molding, a gas, such as nitrogen, is injected into the molten plastic material after it has entered the mold. The low viscosity gas flows into the paths of least resistance within the more viscous plastic, thereby forming hollow channels within the plastic. The process is particularly beneficial for thick section moldings, such as handles, and weight savings of up to 45% or more can result. Also, the molding time cycles can be substantially reduced. In multi-section moldings, the injected gas tends to flow into the thicker sections, again forming hollow continuous channels through which pressure may be transmitted through the medium of the gas. This adds to the scope of the designer and removes some of the design restrictions of conventional molding.

One conventional gas assisted plastic molding process partially fills the mold cavity with an accurately controlled shot volume of plastic. Gas is then injected in order to continue the flow of plastic so that the cavity is filled with plastic and gas. The gas is used to exert outward pressure on the plastic material forcing it against the mold cavity surfaces, thereby achieving a good replication of the mold surface on the plastic molded surface. After the plastic has solidified, the gas pressure is reduced, the gas is exhausted to atmosphere, and the mold is opened and the part ejected. This is sometimes referred to as a "short shot" process.

In another method, the mold cavity is completely or substantially filled with plastic material and then instead of injecting or packing more plastic into the cavity to compensate for the volumetric shrinkage of the plastic as it cools and solidifies, gas is injected into the plastic so that the gas expansion compensates for the plastic contraction. In practice, the initial gas penetration will continue to expand during the cooling cycle while the plastic is shrinking in volume. This is sometimes referred to as a "full shot" process.

In the "full shot" process, it is sometimes difficult to achieve sufficient gas penetration along intended gas channels because there is insufficient volumetric shrinkage of the plastic to provide space for the gas. In such cases, a method of enabling some plastic to outflow from the mold cavity into overflow wells or "secondary" cavities is helpful in providing space for the gas expansion.

In the "short shot" method, some moldings may also be difficult to fill with plastic and gas to the extremities of the molded article cavity. If the shot volume is too little, the gas may break through the leading edge of the plastic material during filling, thereby losing control of the gas. If the shot volume is too high, the gas will not reach the extremities of the cavity. Therefore thick section moldings using the "short shot" process can also benefit from an additional displacement of plastic from the article cavity into an overflow cavity.

A method of at least partially filling the cavity before injection of the gas is described in U.S. Pat. No. 5,098,637. However, in order to use the method of this patent successfully, it is necessary to accurately control the shot volume for both "short shot" and "full shot" methods, because there is no resistance to prevent the plastic from flowing into and filling the overflow cavity before the gas is injected.

In the "short shot" process, the flow of plastic is temporarily stopped at the end of the filling sequence, and then typically there is a delay of up to five seconds before injection of the gas urges the plastic forward to complete the filling of the article cavity with plastic and gas and the overflow cavity with plastic. In the "full shot" process, the mold cavity is filled with, or substantially filled with, molten plastic and the gas is injected to compensate for the volumetric shrinkage of the plastic and to displace plastic into the overflow cavity. In both cases, it is not feasible to apply "packing pressure" by the molding machine because there is nothing to restrain the further flow of plastic. In the "short shot" process, or when nearly filling the cavity in a "full shot" process, there may remain unsightly visible hesitation lines or marks on the molding surface at the position of the first plastic injection.

Another method is disclosed in Japanese Patent Application No. 50-74660, where shut-off valves in runners connect the product cavity and "secondary cavities." In this application, the mold cavity is filled with thermoplastic resin and then a core resin or gas is injected into the cavity while the thermoplastic resin in the mold is expelled from the mold cavity. After the thermoplastic resin fills the mold cavity, the core resin or gas is injected while the resin in the mold cavity is expelled.

SUMMARY OF THE INVENTION

It is an object of the present invention to provide an improved gas assisted molding process for use in the injection molding of plastic materials. It is another object of the present invention to provide an improved gas assisted plastic injection molding process which accurately controls the volume of plastic into the mold cavity and secondary cavity.

It is still another object of the present invention to provide a gas assisted plastic injection molding process in which a good reproducibility of the mold cavity surface on the molded product is produced and flow or weld marks and hesitation marks are minimized or eliminated. It is a still further object of the present invention to provide a gas assisted plastic injection molding process which has improved gas core out with larger expulsion of plastic, thereby reducing the weight and molding cycle time and securing more consistent wall or skin thickness.

It is still another object of the present invention to provide a gas assisted injection molding process which is suitable for use with a wide range of plastic materials, including gas-filled nylon and other filled materials and is also suitable for multi-product cavity molds.

The present invention provides a gas-assisted plastic injection molding process which meets the above objectives and provides an improved process for molding plastic products. In accordance with the present invention, molten plastic material is first injected into the mold cavity. One or more secondary cavities are positioned adjacent the mold cavity and each is provided with a certain volume. It is generally necessary to adjust the volume of the cavities after the first or subsequent mold test trial in order to match the volume of each secondary cavity with the volume of plastic required to be expelled from the molding cavity. This may be done by metal removal from the mold to increase the volume, or addition of metal to reduce the volume. Shutoff valves are positioned between the mold cavity and secondary cavities. The plastic material in the mold cavity is pressurized by the molding machine immediately after filling. The "packing pressure" from the molding machine is maintained for a predetermined time period.

Thereafter, gas is injected into the molten plastic to continue pressuring the plastic material in the mold cavity. Again, after a predetermined time period to allow pressurization of the gas to press the plastic material against the surfaces of the mold cavity, the valves positioned between the mold cavity and the secondary cavities are opened enabling the expulsion of a volume of plastic sufficient to fill the mold cavity or cavities. Initially, the volume of plastic expelled is determined by the time at which the valves are opened. If the valve opening time is prolonged, more of the plastic solidifies in the mold cavity, i.e. the solid skin of the plastic will thicken, and less is expelled; conversely if the valve opening time is advanced, i.e. the delay in opening is reduced, the skin thickness is reduced and more plastic is expelled. When the balance of secondary cavity volume and valve opening time is optimised, the process can be operated consistently shot-after-shot in production. This precisely controls the volume of expelled plastic material. The gas pressure is again held in the mold cavity until the plastic material cools and solidifies. Thereafter, the gas is vented or exhausted from the mold cavity, the mold is opened, and the part is removed or ejected.

The volume of plastic material which is expelled from the mold cavity into the secondary cavity is not dependent on the timing of the gas injection. Instead, the volume of plastic expelled is dependent on the volume of the secondary cavity or cavities.

In an alternate embodiment, at least two secondary cavities are provided. Each are connected to the mold cavity with a separate valve. Each of the secondary cavities is connected to the article mold cavity by a flow runner or conduit in which there is a valve member. The operation of each of the valves is independently controlled and timed. The opening of the valves can be sequentially timed to optimize the required expulsion of plastic from the mold cavity and from different positions in the mold cavity.

In another embodiment of the invention, the plastic expelled by the gas is forced into the injection machine barrel either separately or in combination with one or more secondary cavities.

In a still further embodiment, the opening and closing of the valve members may be operated to allow the flow of plastic from the mold cavity to the secondary or overflow cavities by the application of a selected pressure exerted by the injection of gas. The injection of the gas would transmit pressure to the plastic material, which in turn will open the valve members and overcome a preset closing force. A preset closing force may be applied to the valve member by mechanical springs, pneumatic mechanisms, hydraulic mechanisms, electrical mechanism, or the like.

The opening of the valve members may be controlled in any conventional manner, such as mechanical, pneumatic, hydraulic, electric, or other means. The control can be either digital or computer timed and can be external or integral with the gas pressure control means.

Other objects, features, and benefits of the present invention will become apparent from the following specification when viewed together with the accompanying drawings and appended claims.

DESCRIPTION OF THE PREFERRED EMBODIMENT(S)

Figure 1A:
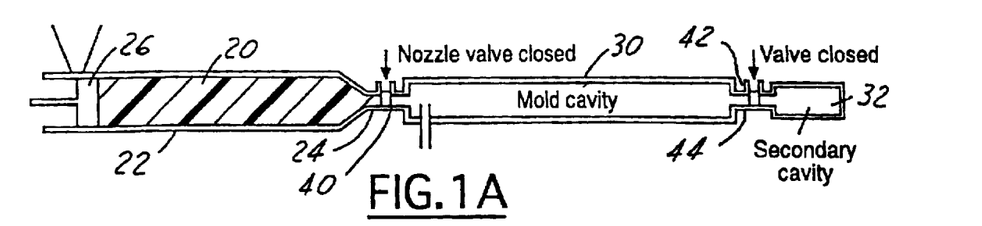
FIGS. 1A–1E illustrate a sequence of steps in a preferred embodiment of the present invention.

FIGS. 1A–1E illustrate the sequence of steps forming a preferred embodiment of the present invention. This process is referred to generally by the reference numeral 10 in the drawings. In FIG. 1A, a quantity of molten plastic material 20 is positioned in the barrel 22 of an injection molding machine (not shown). The injection molding machine can be of any conventional type and can expel the plastic material from the nozzle 24 of the barrel in any conventional manner, such as by a helical screw or a piston 26. Although a piston member 26 is shown and illustrated and described in FIGS. 1A–1E, it is to be understood that any conventional mechanism used to expel the plastic material from a barrel of an injection molding machine can be utilized.

As shown in FIG. 1A, the nozzle 24 of the injection molding machine is connected to a mold cavity 30. The mold cavity 30 is positioned in a conventional mold which in turn is positioned in a conventional molding machine (not shown). A secondary cavity 32 is positioned in communication with the mold cavity 30. A valve member 40 is positioned between the nozzle 24 and the mold cavity 30 while a second valve member 42 is positioned in the conduit or runner 44 positioned between the mold cavity 30 with the secondary cavity 32. The valve members 40 and 42 can be of any conventional type, such as shut-off type valve members, and can be operated in any conventional manner, such as pneumatically, hydraulically, electrically, etc. Control of the valve members 40 and 42 can also be accomplished with any conventional mechanism or system. For example, the mechanism can be computer operated so that the valves can be accurately timed to open and close as desired in accordance with a prespecified injection molding process.

The quantity of plastic material 20 in the barrel 22 of the injection molding machine is sufficient to fill or substantially fill the volume of the mold cavity 30. The plastic material 20 which can be used or utilized with the present invention can be of any conventional type, such as a thermoplastic resin. The plastic material can also be a filled material, that is mixed with a glass or mineral material.

In an alternate embodiment, one or more secondary cavities can be provided. The secondary cavities are each connected to the mold cavity 30 by separate runners. Also, independently controlled separate valve members are positioned in each of the runners or conduits between the mold cavity 30 and the secondary cavities. In this embodiment, the overflow cavities can be filled separately and timed in order to allow the plastic material to be expelled as desired and where necessary in order to optimize the production process and plastic product produced by the process.

Figure 1B:
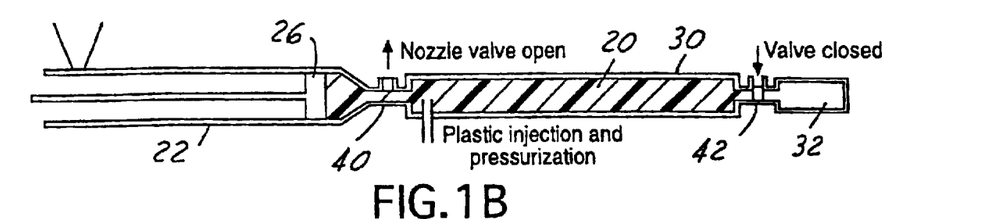

Referring back to FIG. 1, the second step in the process is shown in FIG. 1B. In this step, the plastic resin material 20 is injected by the injection molding machine into the mold cavity 30. The plastic material in the mold cavity is then pressurized by the molding machine ("packing pressure") for a short period of time, for example 1–5 seconds. This insures good reproducibility of the mold surface on the molded article in the cavity. For this process step, valve member 40 is opened in order to allow plastic material to enter the mold cavity 30, but valve member 42 is retained in a closed position in order to prevent any plastic from entering the secondary cavity 32.

Figure 1C:
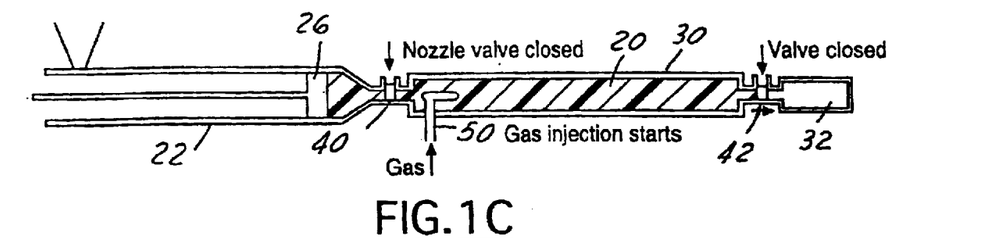

At this point, the gas is injected at selected ram and hold pressures. In the schematic embodiment shown, gas is injected through inlet conduit 50. Initially, the valve member 42 remains in a closed condition for a predetermined amount of time such that the pressure of the gas in the molten material 20 forces the plastic material against the inner surfaces of the mold cavity, again helping to provide a good surface finish on the plastic product. This is shown in FIG. 1C.

Figure 1D:
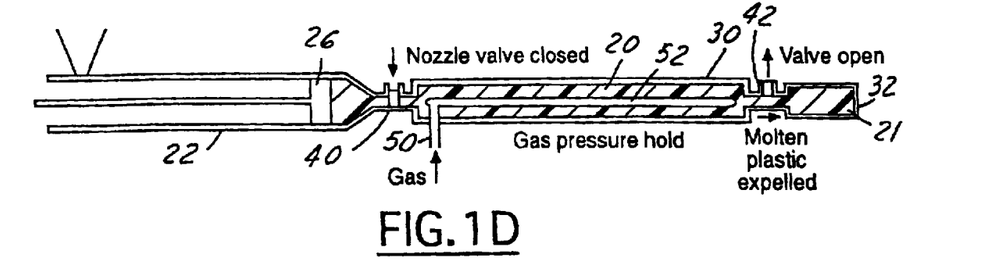

Thereafter, as shown in FIG. 1D, the valve member 40 is closed and the valve member 42 opened. The pressure of the gas 52 in the molten plastic material 20 in the mold cavity 30 causes molten plastic to be expelled from the mold cavity into the secondary cavity 32. In this regard, the molten plastic material is preferably expelled from the center of the thicker sections in the molded article through the connecting gates or runner 44. Thereafter, a gas "hold" or "packing" pressure is maintained in the mold cavity while the plastic material cools and solidifies. This takes on the order of 10–25 seconds or longer, depending on the size and thickness of the molded plastic product.

It is generally necessary to adjust the volume of the cavities after the first or subsequent mold test trial in order to match the volume of each secondary cavity with the volume of plastic required to be expelled from the molding cavity. This may be done by metal removal from the mold to increase the volume, or addition of metal to reduce the volume. Initially, the volume of plastic expelled is determined by the time at which the valves are opened. If the valve opening time is prolonged, more of the plastic solidifies in the mold cavity, i.e. the solid skin of plastic will thicken, and less is expelled; conversely, if the valve opening time is advanced, i.e. the delay in opening is reduced, the skin thickness is reduced and more plastic is expelled. When the balance of secondary cavity volume and valve opening time is optimised, the process can be operated consistently shot-after-shot in production.

The amount of plastic material which is expelled into the overflow cavity can also be controlled by the time at which the valve member 42 is opened.

It is also possible to operate the present process without use of a valve such as valve 40 positioned between the injection molding machine and the mold. It is preferable to include a valve such as 40, however, in order to prevent plastic from being forced back into the screw cylinder when pressurized by the gas.

Figure 1E:
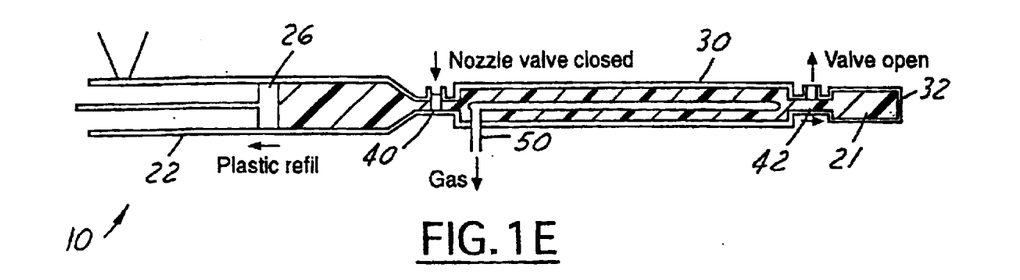

Once the plastic product has sufficiently cooled and solidified, the gas 52 is exhausted, for example, back through conduit 50. This is shown in FIG. 1E. The expelled gas can be either collected and reclaimed for further use, or expelled into the atmosphere. Mechanisms and systems for exhausting or venting pressurized gas from the interior of the molded article prepatory to opening the mold are described in numerous patents in the prior art. In this regard, any conventional mechanism or system for exhausting or venting the gas from the mold and molded article can be utilized in accordance with the present invention. At the same time that the gas is exhausted, the piston or ram 26 of the injection molding machine is typically retracted to its rest position in preparation for another shot of plastic material.

Once the gas is vented or exhausted from the mold cavity, the mold is opened and the finished plastic product is ejected or removed from the mold cavity. At the same time, the expelled plastic material 21 in the secondary cavity 32 is similarly ejected or removed from the mold. The plastic in the cavity 32 can be reground and reused, if desired, or the cavity itself can be used to form another plastic part for possible use.

In some cases, the use of a nozzle shut-off valve 40 or hot runner valve gate is recommended to prevent reverse flow of plastic back into the barrel of the injection molded machine. Also, it is preferred to regrind the runner and plastic material in the secondary cavities to avoid waste of material. Further, if it is necessary to adjust the volume of the secondary cavity after initial molding trials, this can be done by removing or machining metal in order to enlarge the secondary cavity.

The positioning of the gas injectors in the mold cavity should preferably be adjacent to the thicker sections and remote from, and at the opposite extremity to, the expulsion gates and runners. Also, the positioning of the plastic feed gates in the mold cavity should be selected to optimize the flow of plastic into the mold cavity. It may be necessary to prevent in-mold gas pressure from forcing the plastic back into the machine with a shut-off valve, by holding the ram screw forward, or by use of a hot runner system with valve gates.

Figure 2:
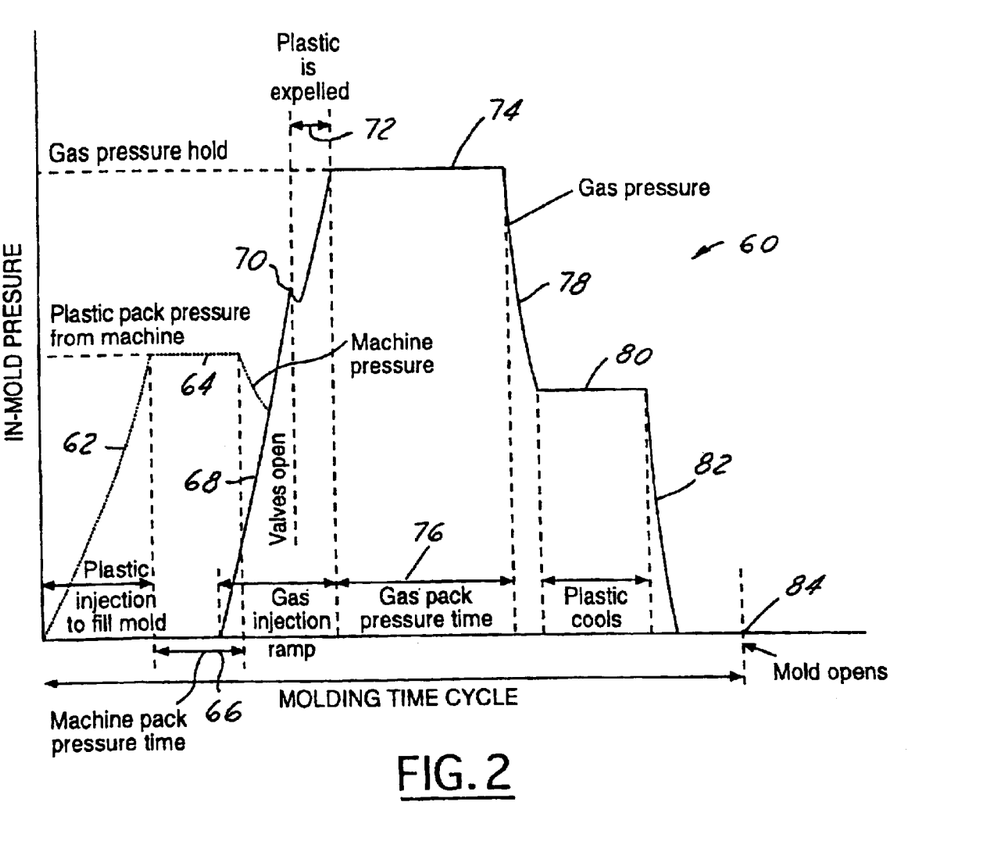
FIG. 2 is a graph further illustrating the in mold pressure time sequence embodiment of the present invention as set forth in FIGS. 1A–1E.

A graph illustrating the sequence of steps described above is shown in FIG. 2. The graph is referred to generally by the reference numeral 60 in FIG. 2 and charts the molding cycle time relative to the pressure in the mold. In this regard, the pressure in the mold initially increases as shown by line 62 as the plastic is injected into the mold cavity. The molding machine then holds the plastic packed pressure as shown by line 64. The time at which the machine packs the pressure is indicated by the arrow 66. That time can be adjusted as desired.

Thereafter, as shown by line 68, the gas is injected into the plastic material in the mold cavity. At point 70, the valve member 44 regulating the flow of plastic material into the secondary cavity is opened. This allows plastic to be expelled from the mold cavity into the secondary cavity. This step is indicated by the arrow 72. Thereafter, the pressure of the gas in the mold cavity is held. This is shown by line 74. The time of the gas packing pressure is shown by the arrow 76 in FIG. 2.

Subsequently, the gas pressure is reduced in the mold. This is shown by line 78. The gas pressure can also be held constant for a period of time, as shown at 80, in order to allow the plastic material to cool and harden. Thereafter, that is once the plastic part is cooled and hardened, it is ejected from the mold. Once the pressure of the gas is vented or exhausted from the mold cavity, as shown by line 82, the mold is opened and the part removed. This is shown at point 84 on the graph of FIG. 2.

With the system and process of the present invention, the method is not dependent on the injection of an accurately controlled shot volume of plastic repeatedly shot after shot. Also, the ability to pressure pack the plastic while the article cavity is filled with plastic, or is filled with plastic and initial injection of gas, insures accurate replication of the mold cavity surface without shrinkage of the plastic from the surface.

Avoiding the need to partially fill the article cavity eliminates the tendency to form hesitation marks on the product at positions to which the plastic flows and stops before the gas is injected.

The dependence on a fixed volume of plastic material which is expelled from the mold cavity eliminates the variable dependence on timing of the gas injection. Also, the present invention is suitable for multi-cavity molds, with each cavity being able to be connected to one or more secondary cavities. It is not believed practical to depend on the balancing of the flow of plastic in order to partially fill each cavity.

The present invention is suitable for a wide range of thermoplastic resin materials, including glass-filled fiber materials which require early pressurization in order to achieve acceptable surface finishes. Also, a more consistent and uniform wall section thickness is achievable throughout the molding channel as a result of more positive control of the gas and plastic flows. The process is further operable on molding machines which are not capable of accurately delivering consistent volumes of plastic material.

The position of the gas injectors in the mold cavity is not as critical as it is with other processes in which overflow cavities are utilized. In this regard, the present invention is suitable for expelling plastic from more than one position in an article cavity. Also, the valve members into the secondary cavities can be sequentially opened and closed in order to optimize plastic expulsion and to avoid thick accumulations of plastic remaining in the molded article.

With the present invention, the injection of an unpressurized accurate shot weight or filling volume is not necessary. Also, the timing of the gas injection is not as critical. The packed pressure exerted by the molding machine and subsequently the gas when the cavity is full of plastic material insures a good reproducibility of the mold cavity and the molded article itself. Flow or weld marks are reduced. Also, the appearance of hesitation marks, when partial filling of a cavity is desired, is also infrequent or minimized with the present invention.

The operation of the valve member 42, as well as any other valve members which are positioned between the mold cavity and the secondary cavities, can be operated independently and timed to be sequential with the other secondary cavities. This allows the plastic to be expelled from the mold cavity in a desired sequence and in order to allow formation of various channels in various thicker sections or members of the product. Also, as noted, the volume of plastic expelled from the mold cavity is not dependent on the timing of the gas. Instead, it is dependent on the timing of the valves and the volume of the secondary cavity or cavities and the opening and closing sequence of the valve members from the mold cavity into the secondary cavities.

In a further embodiment of the present invention, the valves in the runners or conduits between the mold cavities and the secondary cavity or cavities can be operated in a different manner. The valve members may be operable by the application of a selected pressure which is exerted by the injection of gas and in turn a transmission of pressure to the plastic material. This in turn will open the valve member, thus overcoming a preset closing force. The preset closing forces may be applied to the valve members by mechanical spring members or other means, such as pneumatic, hydraulic, or electric.

Further, the opening and closing of the valve members may be controlled by any conventional means, such as pneumatic, hydraulic, electrical, or mechanical means. The opening and closing of the valve members can also be controlled by external means which may include digital or computer timing, external or integral with the gas pressure control means.

Figure 3A:
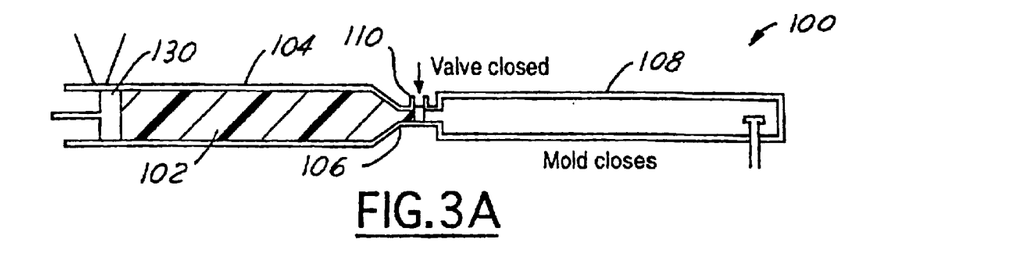
FIGS. 3A–3E illustrate an alternate embodiment of the present invention.
Figure 3B:
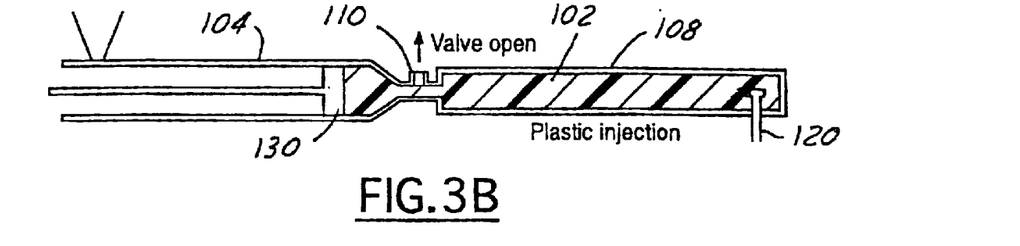

As an alternative to expelling the plastic material into secondary cavities, it is also possible to expel the plastic material back into the injection molding machine barrel. This is accomplished by the gas pressure pushing back the injection screw or piston against a controllable back pressure. This process is shown in FIGS. 3A–3E and referred to generally by the reference numeral 100. As shown in FIG. 3A, plastic material 102 is positioned in a barrel 104 of an injection molding machine (not shown). The barrel 104 has a nozzle 106 which is connected in any conventional manner with a mold cavity 108. A valve member 110 controls the flow of plastic from the barrel member into the mold cavity. At the initial sequence of steps, as shown in FIG. 3B, the valve member 110 is opened allowing plastic material to be expelled or injected from the barrel 104 into the mold cavity 108. Thereafter, the pressure is temporarily held by the injection molding machine relative to the plastic in the mold cavity 108, preferably for at least 1–5 seconds.

Figure 3C:
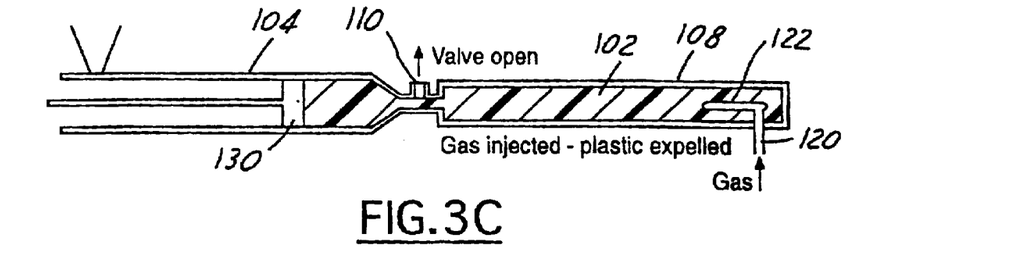

Thereafter, as shown in FIG. 3C, gas is injected into the plastic material in the mold cavity through gas injection conduit 120. The gas 122 expels the plastic back into the machine cylinder and forms a hollow cavity in the plastic material in the mold cavity 108.

At this point, the pressure is reduced from the molding machine screw or plunger member 130 which enables expulsion of molten plastic material 102 from the mold cavity back into the machine cylinder or barrel 104. Space in the barrel 104 can be formed by the force of the gas forcing the plunger member 130 away from the mold.

Figure 3D:
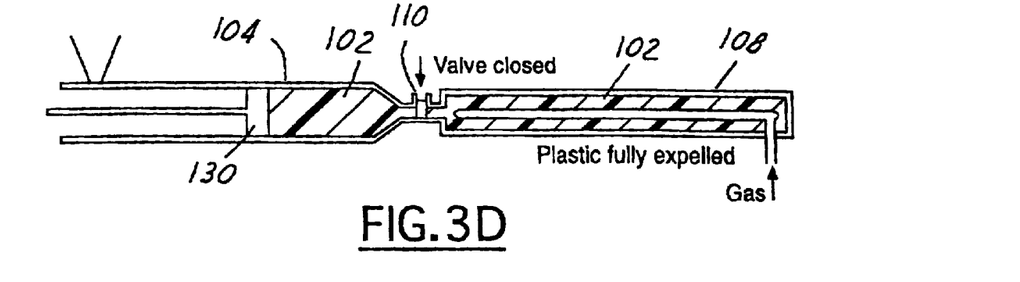
Figure 3E:
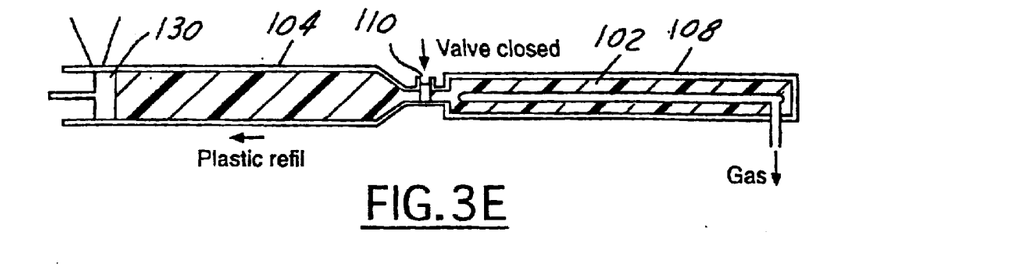

Following completion of plastic expulsion, the gas pressure is held during cooling and solidification of the plastic material in the mold cavity. This is shown in FIG. 3D. At this point, the plastic is subjected to packing pressure and has its surface forced tightly against the inside surfaces of the mold cavity. This produces a good surface finish and creates a full definition of the surface of the mold. Thereafter, the gas pressure in the mold cavity is reduced under control to atmospheric pressure. This is shown in FIG. 3E. Thereafter, the machine barrel 104 is completely refilled with plastic material and ready for the next molding cycle. At the same time, the mold is opened and the formed plastic part is removed or ejected from the molding machine.

The advantages of this alternate embodiment of the present invention is that the expelled plastic can be remolded in succeeding shots. This eliminates regrinding or recovery of the expelled material from a spillover or secondary cavity. Also, retrimming of the molding is not necessary, and the system does not have to expend the cost of additional shutoff valves in the runner members.

While particular embodiments of the invention have been shown and described, numerous variations and alternative embodiments will occur to those skilled in the art. Accordingly, it is intended that the invention be limited only in terms of the appended claims.

What is claimed is:

1. A process for injection molding a hollow plastic article comprising the steps of:

(a) injecting a quantity of plastic material into a mold cavity to substantially fill the mold cavity;

(b) applying a packing pressure to the plastic in the mold cavity;

(c) injecting pressurized gas into the plastic material in the mold cavity in order to combine the application of packing pressure to the plastic;

(d) holding the pressure of the gas and plastic in the mold cavity for a predetermined amount of time; and (e) allowing a portion of the plastic material in the mold to be expelled into at least one secondary cavity coupled to the mold cavity by opening a valve in a runner connecting the mold cavity to the secondary cavity.

2. The process as set forth in claim 1 further comprising the steps of:

(f) permitting the plastic material to solidify;

(g) exhausting the gas from the mold cavity; and (h) removing the plastic article from the mold.

3. The process as set forth in claim 1 wherein said plastic article has at least one section which is thicker than other sections and said charge of pressurized gas is introduced into the thicker section in order to form a hollow portion therein.

4. The process as set forth in claim 1 further comprising the step of applying the packing pressure to the plastic material injection pressure in the mold cavity for a predetermined period of time prior to the injection of gas into the plastic material.

5. The process as set forth in claim 1 wherein said plastic material is injected into the mold cavity from an injection molding machine with a barrel and nozzle, said method further comprising the step of allowing a portion of the plastic material in the mold to be expelled back into the barrel of the injection molding machine.

6. The process as set forth in claim 1 wherein portions of the plastic material are expelled into at least two secondary cavities.

7. The process as set forth in claim 1 further calculating the volume of said at least one secondary cavity in order to allow expulsion of a predetermined amount of plastic material from the mold cavity.

8. The process as set forth in claim 1 wherein at least two secondary cavities are provided and the step of allowing a portion of the plastic material in the mold to be displaced into the secondary cavities comprises opening valve members positioned in conduits connecting the mold cavity with the secondary cavities.

9. The process as set forth in claim 8 further comprising the step of sequentially controlling the opening of the valve members in order to allow selective displacement of plastic material into the at least two secondary cavities.

10. A process for injection molding a hollow plastic article comprising the steps of:

(a) injecting a quantity of plastic material into a mold cavity to substantially fill the mold cavity;

(b) applying a packing pressure to the plastic in the mold cavity;

(c) injecting pressurized gas into the plastic material in the mold cavity;

(d) holding the pressure of the gas and plastic in the mold cavity for a predetermined amount of time;

(e) allowing a portion of the plastic material in the mold to be expelled into at least one secondary cavity coupled to the mold cavity;

(f) permitting the plastic material to solidify;

(g) exhausting the gas from the mold cavity; and (h) removing the plastic article from the mold.

11. The process as set forth in claim 10 wherein said plastic article has at least one section which is thicker than other sections and said charge of pressurized gas is introduced into the thicker section in order to form a hollow portion therein.

12. The process as set forth in claim 10 further comprising the step of applying the packing pressure to the plastic material injection pressure in the mold cavity for a predetermined period of time prior to the injection of gas into the plastic material.

13. The process as set forth in claim 10 wherein said plastic material is injected into the mold cavity from an injection molding machine with a barrel and nozzle, said method further comprising the step of allowing a portion of the plastic material in the mold to be expelled back into the barrel of the injection molding machine.

14. The process as set forth in claim 10 wherein portions of the plastic material are expelled into at least two overflow cavities.

15. The process as set forth in claim 10 further calculating the volume of said at least one secondary cavity in order to allow expulsion of a predetermined amount of plastic material from the mold cavity.

16. The process as set forth in claim 10 wherein the step of allowing a portion of the plastic material in the mold to be displaced comprises opening a valve member in a conduit connecting the mold cavity with the secondary cavity.

* * * * *

(12) INTER PARTES REEXAMINATION CERTIFICATE (0231st)
United States Patent
Pearson (10) Number: US 6,767,487 C1
(45) Certificate Issued: Feb. 15, 2011

(54) PLASTIC EXPULSION PROCESS

(75) Inventor: Terrence C. Pearson, Nantwich (GB)

(73) Assignee: Cinpres Gas Injection Limited, Middlewich, Chesire (GB)

Reexamination Request:
No. 95/000,064, Dec. 6, 2004

Reexamination Certificate for:
Patent No.: 6,767,487
Issued: Jul. 27, 2004
Appl. No.: 09/902,354
Filed: Jul. 10, 2001

(51) Int. Cl.
*B29C 45/17* (2006.01)
*B29C 45/76* (2006.01)

(52) U.S. Cl. .................. 264/40.4; 264/40.1; 264/572
(58) Field of Classification Search .................. None
See application file for complete search history.

(56) References Cited

U.S. PATENT DOCUMENTS

| | | | |
|---|---|---|---|
| 4,208,368 A | | 6/1980 | Egli |
| 4,824,732 A | | 4/1989 | Hendry et al. |
| 4,923,666 A | * | 5/1990 | Yamazaki et al. ........... 264/572 |
| 4,944,910 A | | 7/1990 | Hendry |
| 5,028,377 A | | 7/1991 | Hendry |
| 5,032,345 A | | 7/1991 | Hendry |
| 5,069,858 A | | 12/1991 | Hendry |
| 5,204,050 A | | 4/1993 | Loren |
| 5,204,051 A | | 4/1993 | Jaroschek ................... 264/572 |
| 5,607,640 A | | 3/1997 | Hendry |
| 5,824,261 A | | 10/1998 | Berdan ........................ 264/572 |
| 5,885,518 A | | 3/1999 | Hendry |
| 6,019,918 A | | 2/2000 | Guergov |
| 6,354,826 B1 | | 3/2002 | Thomas |
| 6,375,892 B2 | | 4/2002 | Thomas |
| 6,576,170 B1 | | 6/2003 | Nunnery et al. |
| 6,579,489 B1 | | 6/2003 | Thomas |
| 6,602,460 B2 | | 8/2003 | Thomas et al. |
| 6,716,387 B2 | | 4/2004 | Thomas ...................... 264/572 |

FOREIGN PATENT DOCUMENTS

| | | |
|---|---|---|
| CA | 2125623 | 12/1994 |
| DE | 40 02 503 | 1/1990 |
| DE | 43 34 012 | 10/1993 |
| DE | 10128458 | 2/2003 |
| EP | 0628395 | 6/1994 |
| FR | 1145441 | * 10/1957 |
| GB | 2158002 | 11/1985 |
| JP | 4-62118 | 2/1992 |
| JP | 06297522 | 10/1994 |

OTHER PUBLICATIONS

Dier and Goralski, Gas Assist Injeciton Molding, 2000, Bauer Compressors, Inc., pp. 71–91 and 93–104.*
Rosato et al., Injection Molding Handbook, $2^{nd}$ edition, 1995, International Thomson Publishing, pp. 79–80.*
Rosato, Plastics Processing Data Handbook, $2^{nd}$ edition, 1997, published by Chapman & Hall, pp. 191–193.*

* cited by examiner

*Primary Examiner*—Jerry D. Johnson (57) ABSTRACT

A system and process for gas assisted plastic injection molding. The plastic material is injected into the mold cavity and the molding pressure is held for a period of time. Thereafter, gas is injected into the plastic material and the pressure is again held for a period of time. Thereafter, valve members are opened allowing plastic to be expelled into one or more secondary cavities, or to be expelled back into the machine barrel.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-16 are cancelled.

* * * * *